US012769936B2

(12) United States Patent
Grelle et al.

(10) Patent No.: US 12,769,936 B2
(45) Date of Patent: Oct. 20, 2026

(54) SYSTEMS AND METHODS FOR RATIONALIZING POLICIES USING ARTIFICIAL INTELLIGENCE

(71) Applicant: Wells Fargo Bank, N.A., San Francisco, CA (US)

(72) Inventors: Austin Lee Grelle, Riverside, IL (US); Guangcao Ji, Plano, TX (US); Carleton Jay Lindgren, Jr., Denver, CO (US); Winthrop Treynor Smith, Littleton, CO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 206 days.

(21) Appl. No.: 18/617,440

(22) Filed: Mar. 26, 2024

(65) Prior Publication Data

US 2025/0307536 A1 Oct. 2, 2025

(51) Int. Cl.
*G06F 40/20* (2020.01)

(52) U.S. Cl.
CPC .................................... *G06F 40/20* (2020.01)

(58) Field of Classification Search
CPC ................................. G06F 40/00; G06F 40/20
See application file for complete search history.

(56) References Cited

U.S. PATENT DOCUMENTS 10,922,621 B2 2/2021 Buccapatnam Tirumala et al.
11,314,922 B1 4/2022 Ramezani et al.
11,410,184 B2 8/2022 Marascu et al.
11,790,368 B2 10/2023 Kwatra et al.
2018/0053128 A1 2/2018 Costas
2019/0347284 A1* 11/2019 Roman ................... G06F 16/93
2019/0354583 A1* 11/2019 Ralhan ..................... G06N 3/09
2020/0134004 A1* 4/2020 Simonson ............. G06F 40/166
2022/0207241 A1 6/2022 Bettencourt-Silva et al.
2023/0177627 A1 6/2023 Mulligan et al.
2024/0202467 A1* 6/2024 GoGwilt ............... G06F 40/166
2025/0139642 A1* 5/2025 Radhakrishnan .... G06Q 30/018
2025/0238607 A1* 7/2025 Turner .................. G06F 40/186

FOREIGN PATENT DOCUMENTS

CN 112214615 A * 1/2021 ........... G06F 16/322

* cited by examiner

*Primary Examiner* — Sean E Serraguard
(74) *Attorney, Agent, or Firm* — SCHWEGMAN LUNDBERG & WOESSNER, P.A.

(57) ABSTRACT

Various examples are directed to systems and methods for rationalizing policies using artificial intelligence. A method includes receiving policy data of a plurality of policies from one or more data sources, and comparing policy data of a first policy of the plurality of policies to policy data of one or more second policies of the plurality of policies. Using artificial intelligence, the compared policy data is analyzed to determine overlaps and gaps in the first policy and the one or more second policies, and the first policy and the one or more second policies are optimized to reduce the overlaps and gaps in the first policy and the one or more second policies. The optimized first policy and the optimized one or more second policies are stored in a storage library, and an interactive interface to the storage library is provided for one or more users of the system.

20 Claims, 11 Drawing Sheets

710

SYSTEMS AND METHODS FOR RATIONALIZING POLICIES USING ARTIFICIAL INTELLIGENCE

TECHNICAL FIELD

This document relates generally to computer systems and more particularly to systems and methods for rationalizing policies using artificial intelligence (AI).

BACKGROUND

Various sources of data may be used to provide input for institutional decision making. An institution may be constrained or directed in decision making by policies that are enacted, internally and externally, both to ensure compliance with regulations and provide that the business of the institution proceeds in a way that management intends. The volume of these policies has increased greatly over time, and there is a potential for gaps and inconsistencies in the policies that may affect institutional decision making. In addition, the policies may be stored in disparate data structures, and these data sources may be structured or unstructured and may have compatibility issues with each other and with common data repositories. Improved systems and methods for rationalizing and reconciling large volumes of policies are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

An institution or a business may be constrained or directed in decision making by policies that are enacted, internally and externally, both to ensure compliance with regulations and provide that the business of the institution proceeds in a way that management intends. The volume of these policies has increased greatly over time, and there is a potential for gaps and inconsistencies in the policies that may affect institutional decision making. Improved systems and methods for rationalizing and reconciling large volumes of policies are needed.

The present subject matter provides systems and methods for rationalizing policies using machine learning, such as artificial intelligence, according to various embodiments. The present systems and methods are demonstrated with policies for financial institutions, but may be used for any situation in which multiple rules or policies are used that may include conflicting or overlapping provisions.

Figure 1A:
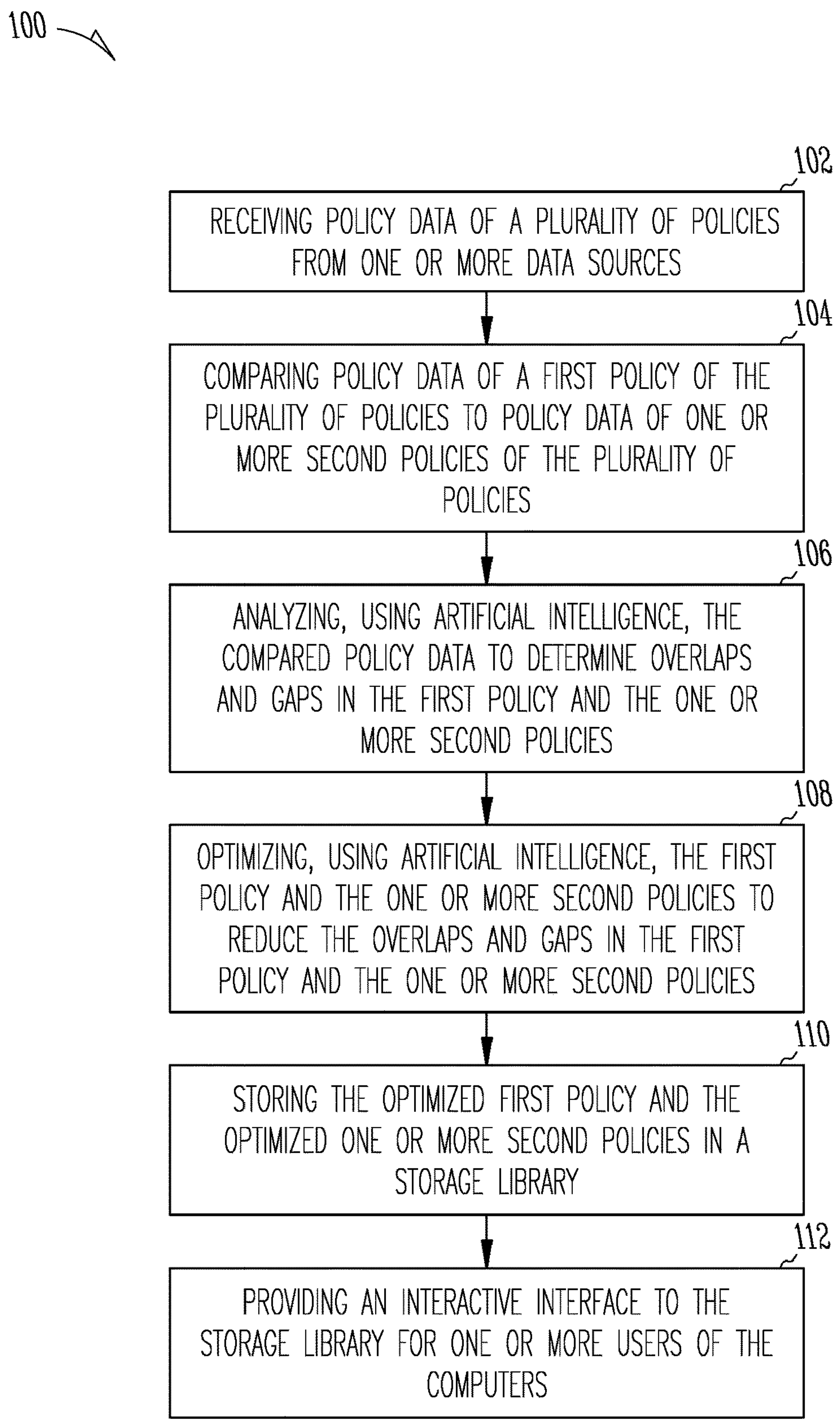
FIG. 1A illustrates an example embodiment of a method for optimizing policies using artificial intelligence, according to various embodiments.

FIG. 1A illustrates an example embodiment of a computer-implemented method for optimizing policies using artificial intelligence, according to various embodiments. The method 100 includes receiving policy data of a plurality of policies from one or more data sources, at step 102, and comparing policy data of a first policy of the plurality of policies to policy data of one or more second policies of the plurality of policies, at step 104. The data may be received from datastores internal to an organization or external from the organization. The policy data may be compared using conventional logic or by using machine learning, in various examples. The compared policy data is analyzed using machine learning such as artificial intelligence to determine overlaps and gaps in the first policy and the one or more second policies, at step 106, and the first policy and the one or more second policies are optimized to reduce the overlaps and gaps in the first policy and the one or more second policies, at step 108. The system may automatically adjust policies and provide output of what was adjusted, or the system may make recommendations for adjusting the policies based on the analysis. The optimized first policy and the optimized one or more second policies are stored in a storage library, at step 110, and an interactive interface to the storage library is provided for one or more users of the system, at step 112. The storage library may be a datastore such as a database, cloud storage, or other repository, in various embodiments. The interactive interface may be provided on any device, including a user device such as a personal computer or smartphone, in some examples.

In various examples, optimizing or consolidating the set of policies, including the first policy and the one or more second policies, includes minimizing a number of policies. For example, a set of policies may be combined into one overarching single policy. In one embodiment, a domestic and international travel policy may be consolidated. Optimizing the first policy and the one or more second policies includes minimizing complexity of at least one of the plurality of policies, in various embodiments. In some examples, optimizing the first policy and the one or more second policies includes minimizing a number of omissions or gaps in the first policy and the one or more second policies. For example, the system may differentiate one or more policies by increasing detail and potentially creating additional policies. Thus, optimizing may involve expansion or contraction of the total policy library based on the activity, in various embodiments. Optimizing the first policy and the one or more second policies includes maximizing coverage of laws or regulations in the first policy and the one or more second policies, in some embodiments. In various embodiments, optimizing the first policy and the one or more second policies includes adding, changing or removing language from one or more of the first policy and the one or more second policies. In various examples, the artificial intelligence (AI) includes a large language model (LLM).

Figure 1B:
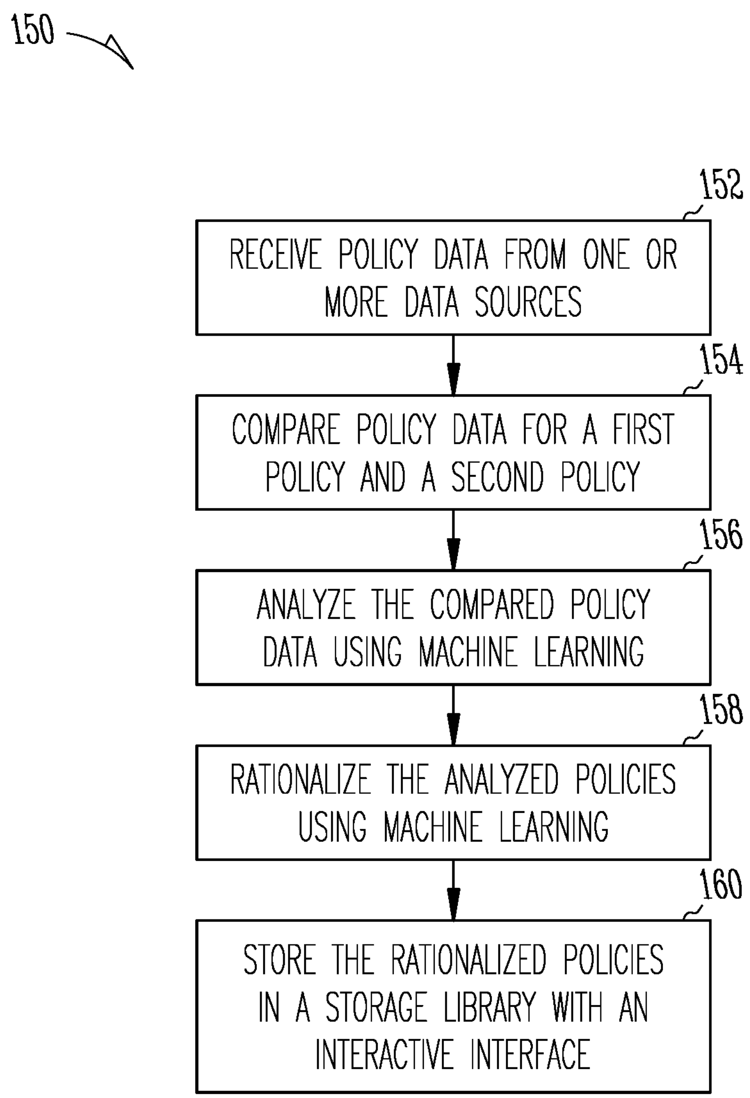
FIG. 1B illustrates an example embodiment of a method for rationalizing policies using machine learning, according to various embodiments.

FIG. 1B illustrates an example embodiment of a computer-implemented method for rationalizing policies using machine learning, according to various embodiments. As referred to herein, rationalized policies refers to policies that have undergone the process facilitated by the present tool, including potentially adding, removing, and/or changing portions of the policies. A rationalized set of documents includes no duplication, includes easy to understand content, and includes clearly defined relationships to other polices or external sources. The method 150 includes receiving policy data from one or more data sources, at step 152, and comparing policy data for a first policy and a second policy at step 154. The data may be received from datastores internal to an organization or external from the organization. The policy data may be compared using conventional logic or by using machine learning, in various examples. At step 156, the compared policy data is analyzed using machine learning, and the analyzed policies are rationalized using machine learning at step 158. The system may automatically adjust or rationalize policies and provide output of what was adjusted, or the system may make recommendations for adjusting the policies based on the analysis. At step 160, the rationalized policies are stored in a storage library with an interactive interface. The storage library may be a datastore such as a database, cloud storage, or other repository, in various embodiments. The interactive interface may be provided on any device, including a user device such as a personal computer or smartphone, in some examples.

The present subject matter relates to using AI to rationalize or reconcile a large volume of policies. In an example, this may include using machine learning such as AI to look for omission, holes or gaps in the policies. In one example, if a law mandates that companies offering sick leave provide that employees be able to utilize the sick leave in the event of a natural disaster, and the existing sick leave policy does not cover this qualification, the present system would identify a gap or omission that may be remedied using optimization or rationalization. One problem solved includes determining overlapping policies, conflicting policies, etc., and reconciling them using an LLM AI, for example. In various embodiments, the present system looks for similarities between chunks of data in policies. When overlapping or conflicting policies, additional non-policy documents (such as controls) or libraries are found, then a human can interact with them using the provided interactive interface, in various examples. In some examples, the present system may output details about what is similar about the policies and what might be different. In addition, the present system may provide a historical perspective at how the changes to policies are made and track who owns and manages the policies. Some institutions are governed or guided by thousands of policies that may overlap or conflict, or have gaps, in some examples. The present subject matter may leverage institutional knowledge of users of policies and consolidate policies to cure overlaps, gaps and/or conflicts, in various embodiments.

The present system may track changes over time, and provide feedback for users based on policy changes, in various examples. In various embodiments, the present system may optimize policies by balancing coverage to gaps, thereby making sure to cover the regulations, laws, and other design choices versus ballooning too many policies. In some embodiments, the present system may optimize policies by providing for simplification of the policies, breaking them down into smaller components or combining them where more appropriate. The present system may use machine learning to look for holes in the policies based on regulations, laws, other requirements, or the like, in various examples. Various regulations may be developed and rationalized (add, remove, change portions of the policies) over time, and the present system can compare the current policies to the change in regulations to see what might be different. In various examples, the present subject matter provides for the optimization of policies concepts, such as minimizing a number of policies versus minimizing complexities of policies, minimizing a number of gaps, and/or maximizing coverage of laws or regulations.

A number of organizations and entities, such as financial institutions, have policies in place to ensure compliance with regulations and to ensure that the organization proceeds with business in way that management intends. In various examples, it may be unclear which policies apply to certain situations or events, and there may be contradictions between policies that apply to the situations or events. Previously, policies were reconciled by hand usually by expert users, such as internal experts or third-party consultants. The present system provides for using machine learning to organize and reconcile the various policies. For example, present system may be used to compare policies against one another to locate and identify similarities between chunks of text from the policies. In addition, the present system may compare the policies against regulations (or other external directives) to see if there is a gap or a conflict. The policies and regulations may be in the same datastore, or in multiple different datastores in various examples.

In various examples, when an existing policy has a provision that is added, changed or removed, it may no longer be in synch with other policies, which may trigger the present system to reconcile policies or identify areas to be reconciled between policies. The present system provides for storing policies from one or more sources into a single library for comparison and rationalization, optimization and/or reconciliation. In various examples, the present system may consolidate multiple policies into a single policy to eliminate redundancy and contradictions. For example, the system may consolidate a domestic travel policy and an international travel policy into a single policy.

According to various embodiments, the present system may exclude matches within the same document and highlight exact or verbatim matches across different documents to identify super matches for escalation of rationalization. The present system may provide matches or similarities by document or by section of document using semantic meaning, and may focus on smaller text sections for comparison, in various embodiments. The present system may provide a policy score, such as a quality or complexity score, in various embodiments. In some examples, the present system may compare a chunk (section of a document or policy) identification (ID) to a document ID or policy number to ensure consistency. The system may highlight matches across policies using a semantic search, such that the meaning of words are matched, not just frequency of words matching, in various examples. The present system may eliminate the need for a human user to reconcile policies (such as by automatically eliminating duplication), or may reduce the time and effort needed by a human user to reconcile policies, in various examples.

In some examples, the system provides a user interface with a similarities and differences button, showing results of a comparison of multiple policies by machine learning. The present system may translate policy text into a vector, such that vectors pointing in the same direction are potentially redundant, in various examples. For example, a vector embedding (converting words or sentences into numerical data that captures their meaning or relationship) may be applied, and the resulting numerical vector may be used to calculate similarity between two policy texts, such as in the comparisons of step 104 in FIG. 1A and step 154 in FIG. 1B. In some embodiments, the present subject matter provides a systematic approach to examine an entire library of policies. The present system and method provides for minimizing a number of policies, minimizing gaps across policies, minimizing complexity of policies, and maximizing coverage for policies, in various embodiments.

According to various embodiments, the present system may run a batch process to compare and reconcile multiple policies. The present system may provide a report detailing the results of the process, and the report may be provided on demand or at some programmable interval, in some examples. In some embodiments, the present system may automatically optimize one or more policies and/or reconcile multiple policies. In other embodiments, the present system may provide recommendations to optimize one or more policies and/or reconcile multiple policies. For example, the system may recommend that a group of policies should be consolidated or expanded, so that a user may focus on the output of the system and not have to review the entire policies. In some embodiments, the present system provides an automated process that does not require user input to initiate processing of policies.

In various examples, the present system provides policy optimization and a reporting feature (or reporting view output) to illustrate what was completed, to prove using metrics what has been determined and to prevent duplication of efforts to cover the same policies. A user or agent may receive recommendations from the present system to focus the user's time for policy review, in some examples. In various embodiments, a chain or tree type output may be provided, to assist a user in understanding what differences exist between two polices. The system may receive a new policy as input, and then search for overlaps with what has been done before, and compare existing policies against the new policy to optimize and consolidate the policies, in various embodiments. In some examples, the present system may provide a knowledge graph as an output, to map how policies relate to each other, and how the policies relate to regulations. The knowledge graph may provide a regulator with a map with what portion of a policy is relevant (a hierarchy) to a particular regulation, in one example.

The present subject matter may be used with any type of data storage, including but not limited to data enterprise data lakes (EDLs), databases (DBs), and Google stores, for example. While the present subject matter has been demonstrated using input data received from databases, any data source may be used by the present subject matter such as batch, real time or distributed data. In addition, the present system can support output of any type of data, in various embodiments, and may be use case dependent, with outputs to files, databases, fixed messages, scripts, batch, or published data. The present system provides for a software independent framework, which can run on Windows, Linux, Unix, or any other platform. The present system may provide one or more user interfaces, in various embodiments, such as graphic displays, custom configurations, spreadsheets, or any other type of user interface may be applied or provided on top of the present configuration. In various examples, the present system uses machine learning such as artificial intelligence to support data ingestion and processing.

Various embodiments include a computing system with one or more processors and a data storage system in communication with the one or more processors, wherein the data storage system comprises instructions thereon that, when executed by the one or more processors, causes the one or more processors to execute the steps of the methods of FIGS. 1A-1B.

The machine learning may include a machine learning model including a neural network. The machine learning model may include one or more of a long short-term memory (LSTM) network, bidirectional encoder representations from transformers (BERT), natural language processing (NLP), or an artificial intelligence (AI)-based knowledge tree, in various examples. In various examples, the artificial intelligence includes a large language model (LLM). Other types of machine learning models may be used without departing from the scope of the present subject matter.

Various embodiments include a non-transitory computer-readable storage medium, the non-transitory computer-readable storage medium including instructions that, when executed by computers, cause the computers to perform operations including the methods of FIGS. 1A-1B. In various examples, optimizing the first policy and the one or more second policies includes minimizing a number of policies. Optimizing the first policy and the one or more second policies includes minimizing complexity of at least one of the plurality of policies, in various embodiments. In some examples, optimizing the first policy and the one or more second policies includes minimizing a number of gaps in the first policy and the one or more second policies. Optimizing the first policy and the one or more second policies includes maximizing coverage of laws or regulations in the first policy and the one or more second policies, in some embodiments. In various embodiments, optimizing the first policy and the one or more second policies includes adding, changing or removing language from one or more of the first policy and the one or more second policies.

Figure 2:
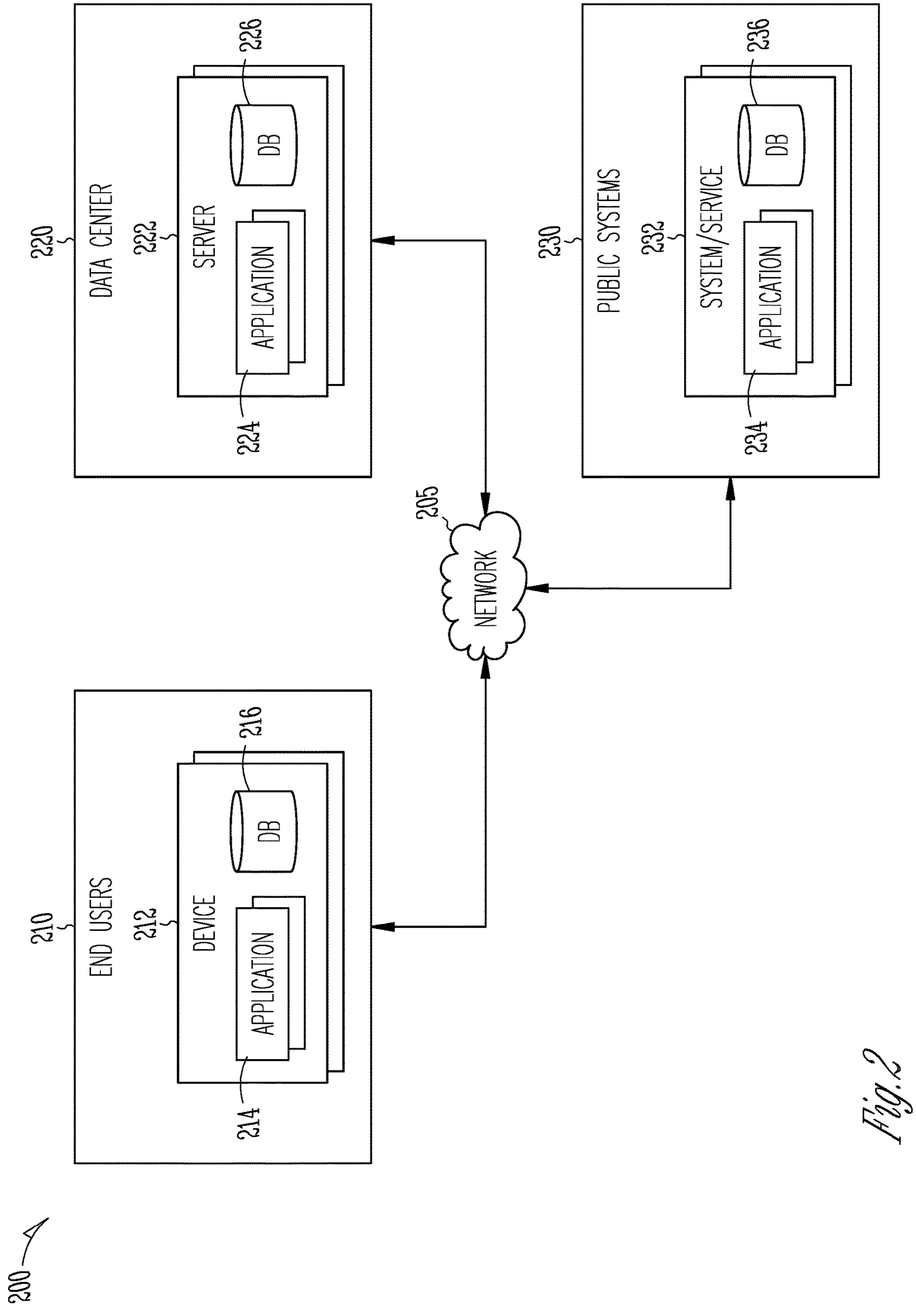
FIG. 2 illustrates an exemplary infrastructure for use in the present subject matter, according to various embodiments.

FIG. 2 illustrates an exemplary infrastructure for providing a system of the present subject matter. The infrastructure may comprise a distributed system 200 including a computing system that may include a client-server architecture or cloud computing system. Distributed system 200 may have one or more end users 210. An end user 210 may have various computing devices 212, which may be a machine 800 as described below. The end-user computing devices 212 may comprise applications 214 that are either designed to execute in a stand-alone manner, or interact with other applications 214 located on the device 212 or accessible via the network 205. These devices 212 may also comprise a data store 216 that holds data locally, the data being potentially accessible by the local applications 214 or by remote applications.

The system 200 may also include one or more data centers 220. A data center 220 may be a server 222 or the like associated with a business entity that an end user 210 may interact with. The server 222 or other portions of the distributed system may create and manage the system for rationalizing policies, such as by performing operations including the methods of FIGS. 1A-1B, in various embodiments. The business entity may be a computer service provider, as may be the case for a cloud services provider, or it may be a consumer product or service provider, such as a financial institution. The data center 220 may comprise one or more applications 224 and databases 226 that are designed to interface with the applications 214 and databases 216 of end-user devices 212. Data centers 220 may represent facilities in different geographic locations where the servers 222 may be located. Each of the servers 222 may be in the form of a machine(s) 800.

The system 200 may also include publicly available systems 230 that comprise various systems or services 232, including applications 234 and their respective databases 236. Such applications 234 may include news and other information feeds, search engines, social media applications, and the like. The systems or services 232 may be provided as comprising a machine(s) 800.

The end-user devices 212, data center servers 222, and public systems or services 232 may be configured to connect with each other via the network 205, and access to the network by machines may be made via a common connection point or different connection points, e.g., a wireless connection point and a wired connection. Any combination of common or different connections points may be present, and any combination of wired and wireless connection points may be present as well. The network 205, end users 210, data centers 220, and public systems 230 may include network hardware such as routers, switches, load balancers and/or other network devices.

Other implementations of the system 200 are also possible. For example, devices other than the client devices 212 and servers 222 shown may be included in the system 200. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 222.

Figure 3:
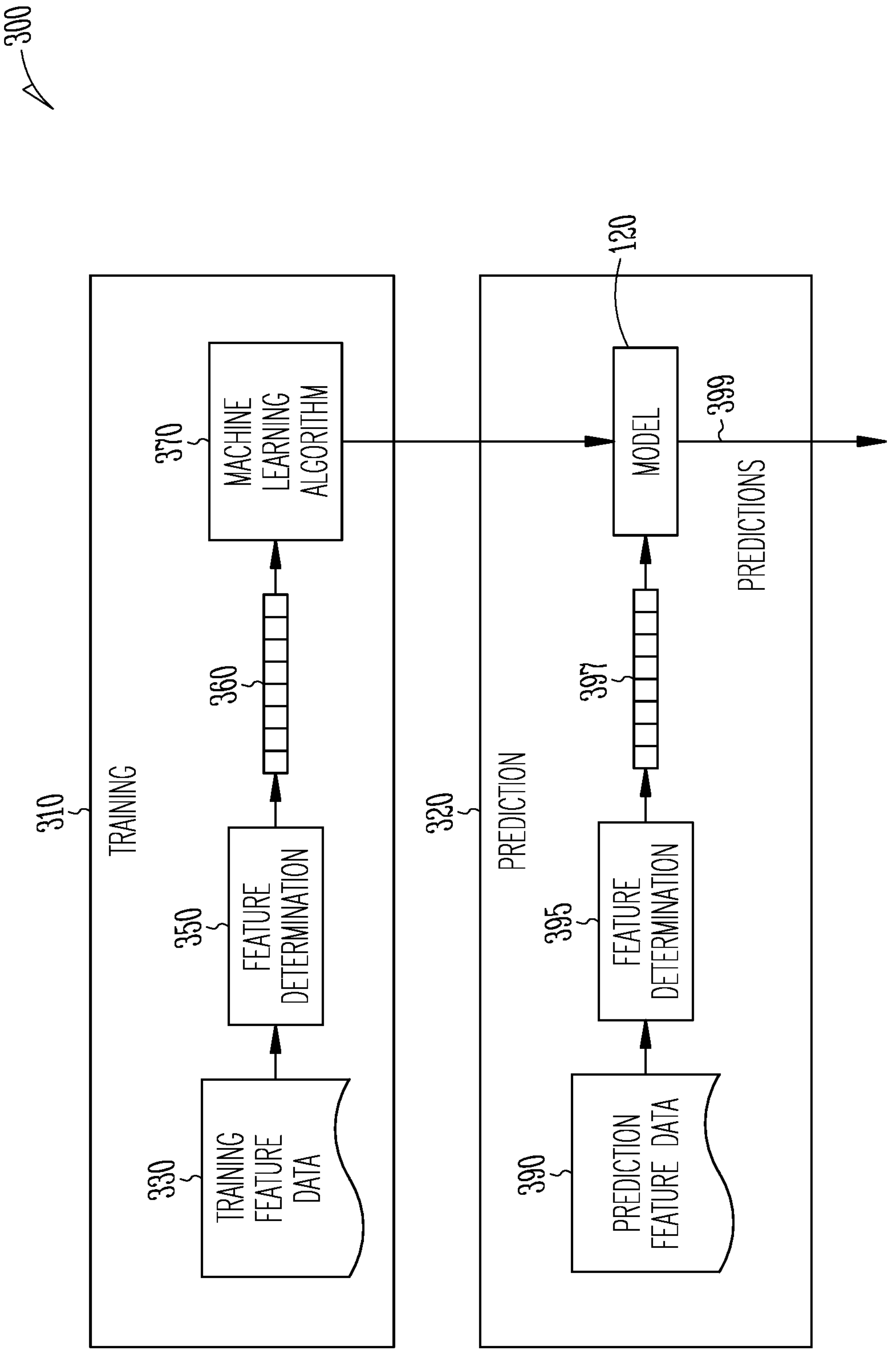
FIG. 3 illustrates an example machine learning module for rationalizing policies, according to various embodiments.

FIG. 3 shows an example machine learning module 300 according to some examples of the present disclosure. The machine learning module 300 may be implemented in whole or in part by one or more computing devices. In some examples, the training module 310 may be implemented by a different device than the prediction module 320. In these examples, the model 120 may be created on a first machine and then sent to a second machine. In various examples, the machine learning module 300 may be used generally for rationalizing or optimizing policies.

Machine learning module 300 utilizes a training module 310 and a prediction module 320. Training module 310 inputs training feature data 330 into feature determination module 350. The training feature data 330 may include data determined to be predictive of one or more of rationalizing or optimizing policies. Categories of training feature data may include policy data, financial data, user portfolio data, tracked user data, input user data, news articles, social media data, other third-party data, or the like. Specific training feature data and prediction feature data 390 may include, for example one or more of: current tracked user policy data, past tracked user policy data, and the like.

Feature determination module 350 selects training vector 360 from the training feature data 330. The selected data may fill training vector 360 and comprises a set of the training feature data that is determined to be predictive of rationalizing or optimizing policies. In some examples, the tasks performed by the feature determination module 350 may be performed by the machine learning algorithm 370 as part of the learning process. Feature determination module 350 may remove one or more features that are not predictive of rationalizing or optimizing policies to train the model 120. This may produce a more accurate model that may converge faster. Information chosen for inclusion in the training vector 360 may be all the training feature data 330 or in some examples, may be a subset of all the training feature data 330.

In other examples, the feature determination module 350 may perform one or more data standardization, cleanup, or other tasks such as encoding non numerical features. For example, for categorical feature data, the feature determination module 350 may convert these features to numbers. In some examples, encodings such as "One Hot Encoding" may be used to convert the categorical feature data to numbers. This enables a representation of the categorical variables as binary vectors and provided a "probability-like" number for each label value to give the model more expressive power. One hot encoding represents a category as a vector whereby each possible category value is represented by one element in the vector. When the data is equal to that category value, the value of the vector is a '1' and all other elements are zero (or vice versa).

The training vector 360 may be utilized (along with any applicable labels) by the machine learning algorithm 370 to produce a model 120. In some examples, other data structures other than vectors may be used. The machine learning algorithm 370 may learn one or more layers of a model. Example layers may include convolutional layers, dropout layers, pooling/up sampling layers, SoftMax layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected. In other examples, machine learning algorithm may be a gradient boosted tree and the model may be one or more data structures that describe the resultant nodes, leaves, edges, and the like of the tree.

In the prediction module 320, prediction feature data 390 may be input to the feature determination module 395. The prediction feature data 390 may include the data described above for the training feature data, but for a specific items such as rationalizing or optimizing policies. In some examples, the prediction module 320 may be run sequentially for one or more items. Feature determination module 395 may operate the same, or differently than feature determination module 350. In some examples, feature determination modules 350 and 395 are the same modules or different instances of the same module. Feature determination module 395 produces vector 397, which is input into the model 120 to produce predictions 399. For example, the weightings and/or network structure learned by the training module 310 may be executed on the vector 397 by applying vector 397 to a first layer of the model 120 to produce inputs to a second layer of the model 120, and so on until the prediction 399 is output. As previously noted, other data structures may be used other than a vector (e.g., a matrix).

The training module 310 may operate in an offline manner to train the model 120. The prediction module 320, however, may be designed to operate in an online manner. It should be noted that the model 120 may be periodically updated via additional training and/or user feedback. For example, additional training feature data 330 may be collected. The feedback, along with the prediction feature data 390 corresponding to that feedback, may be used to refine the model by the training module 310.

In some example embodiments, results obtained by the model 120 during operation (e.g., outputs produced by the model in response to inputs) are used to improve the training data, which is then used to generate a newer version of the model. Thus, a feedback loop is formed to use the results obtained by the model to improve the model.

The machine learning algorithm 370 may be selected from among many different potential supervised or unsupervised machine learning algorithms.

Examples of learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, gradient boosted tree, linear classifiers, quadratic classifiers, k-nearest neighbor, linear regression, logistic regression, a region based CNN, a full CNN (for semantic segmentation), a mask R-CNN algorithm for instance segmentation, and hidden Markov models. Examples of unsupervised learning algorithms include expectation-maximization algorithms, vector quantization, and information bottleneck method.

Figure 4:
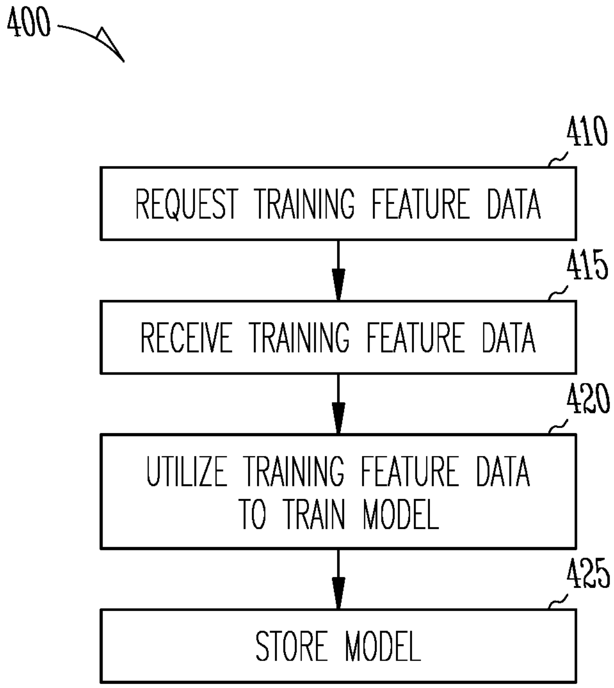
FIG. 4 illustrates a flowchart of a method of training a model for rationalizing policies, according to various embodiments.

FIG. 4 illustrates a flowchart of a method 400 of training a model for rationalizing or optimizing policies, according to various embodiments. At operation 410 the training module (e.g., training module 310 as implemented by a model system) may request training feature data, from one or more systems. At operation 415 the training module may receive the training feature data. The training feature data may be processed using more data standardization, cleanup, or other tasks such as encoding non numerical features (e.g., one hot encoding). At operation 420, the training model may use the training feature data to train the model. For example, by creating a gradient boosted tree, neural network, or the like. At operation 425 the model may be stored in a storage device. In some examples in which the training operations and predictions are done on separate computing devices, the model may be transmitted to a computing device doing predictions. In various examples, the model may be used for one or more of rationalizing or optimizing policies.

Figure 5A:
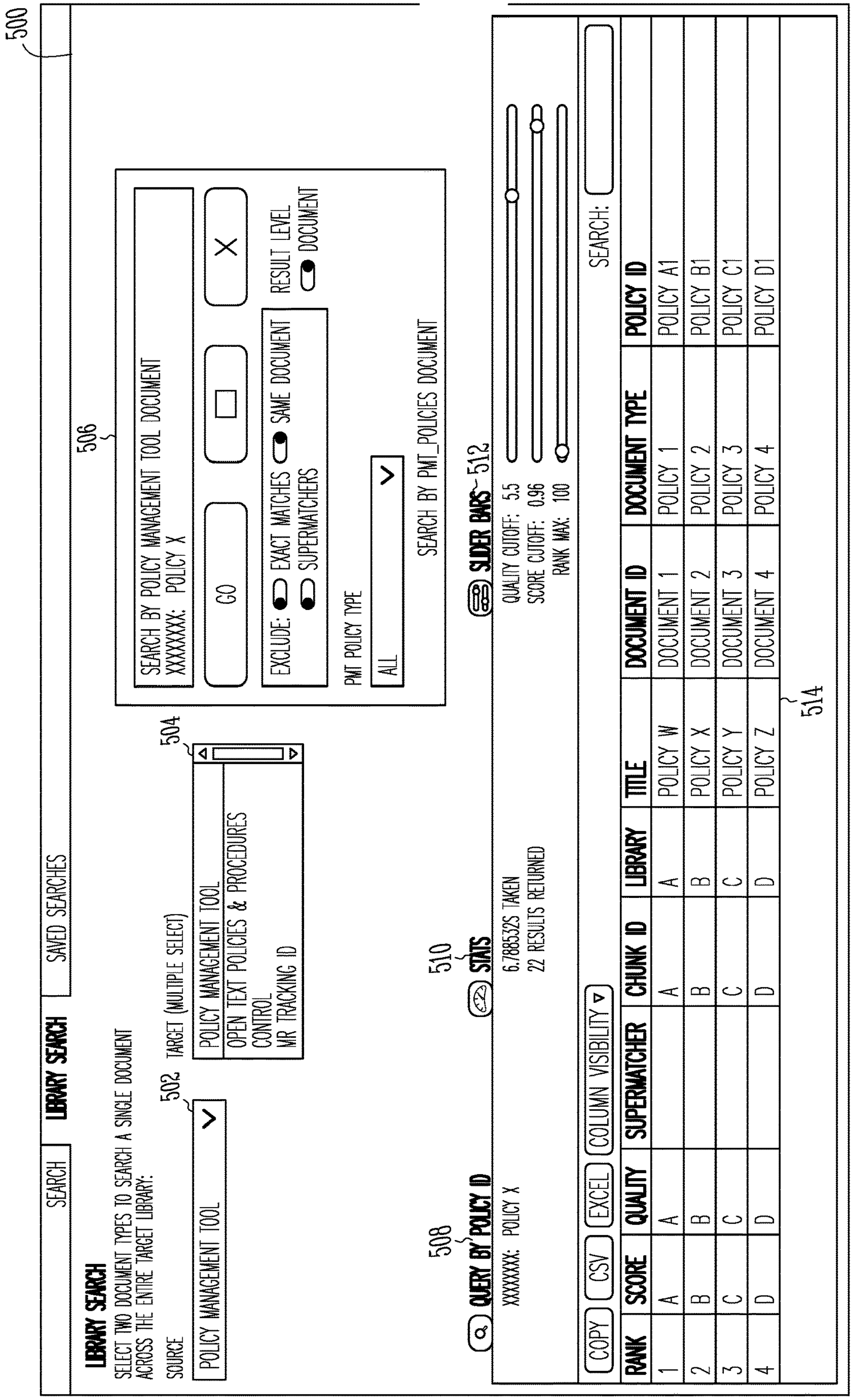
FIGS. 5A-7B illustrate example screenshots from a system for rationalizing policies using machine learning, according to various embodiments.

FIGS. 5A-7B illustrate example screenshots from a system for rationalizing policies using machine learning, according to various embodiments. In FIG. 5A, a graphic user interface (GUI) 500 is provided on a display to a user. This GUI 500, or screenshot, illustrates a landing page for a user entering the present system. The user may select document types to search for documents in a storage library, in various embodiments, including selecting a source from a source dropdown menu 502 and selecting a target from a target dropdown menu 504. In various examples, a policy is selected for search (or query) and launched using a policy selection window 506. The GUI 500 provides an identification of the selected query 508, statistics of the query results 510, and controls such as slider bars 512 to illustrate and select quality, scores and/or ranking of the query results 514, in various examples. FIG. 5B illustrates a pop up window 520 from a user clicking on selection window 506, providing a selected policy and options for managing the selected policy, including information such as individuals and/or organizations responsible for managing the policy, procedures for monitoring the policy and requesting exceptions or reporting violations of the policy. A user may click on a view document button 522 to view the policy document, or a compare document button 524 to compare the current policy to another identified policy, in various examples.

Figure 5B:
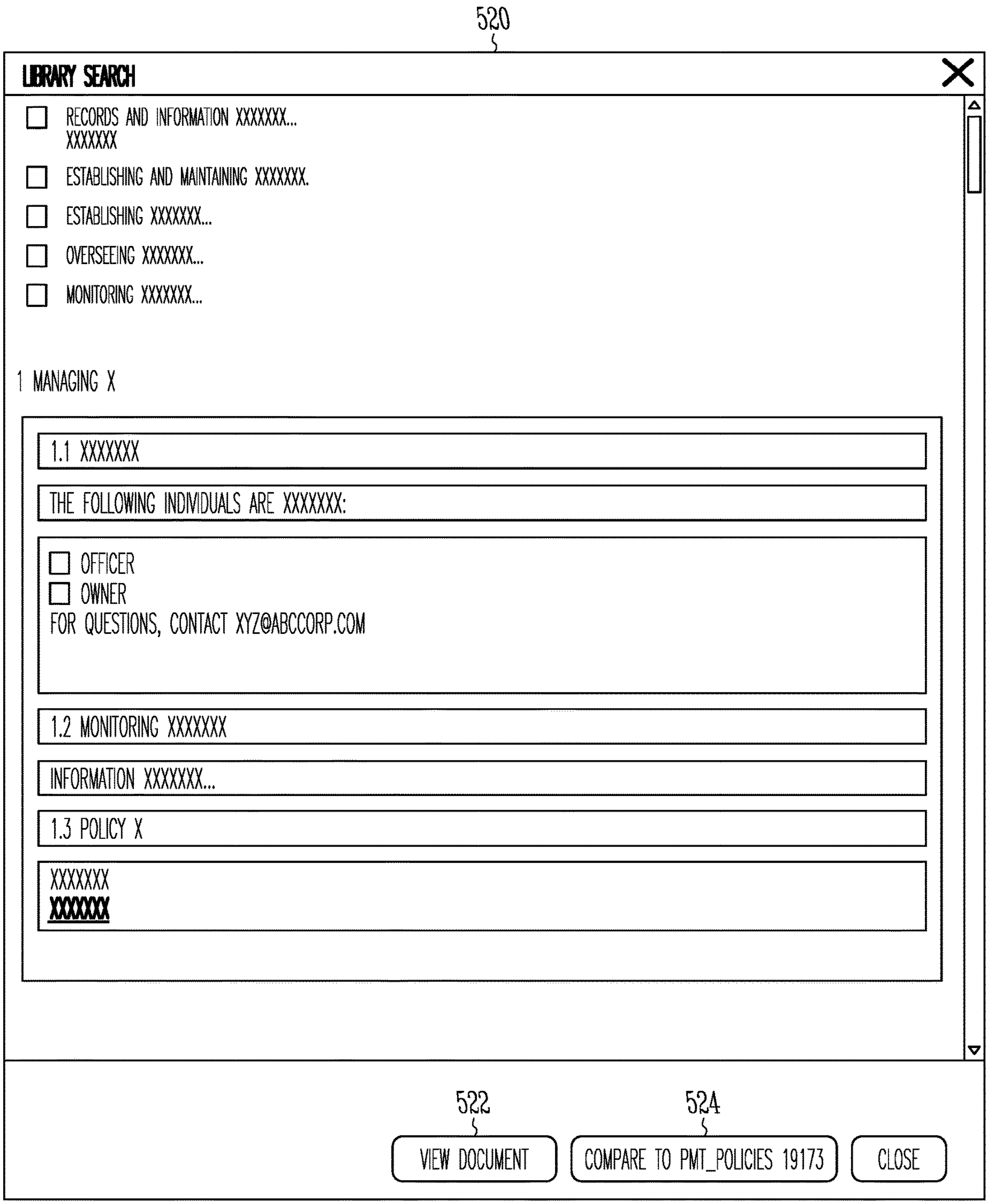
Figure 6:
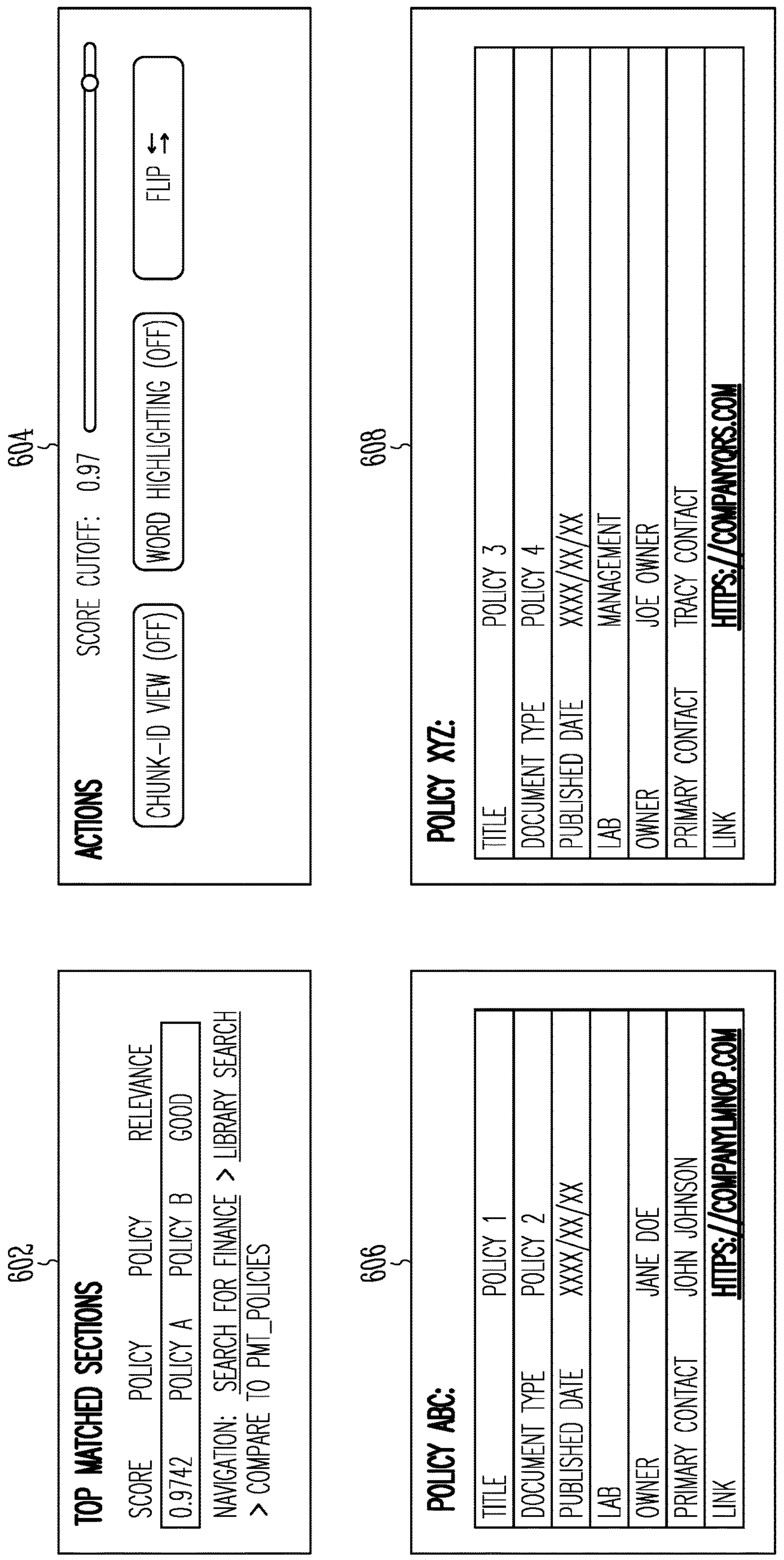

FIG. 6 illustrates a comparison display showing the results of comparing of two policies, such as by using the compare document button 524 in FIG. 5B, for example. The displayed results of the comparison include, but are not limited to, a top matched sections display 602, an actions display 604, a first policy summary display 606, and a second policy summary display 608, in various embodiments. In one example, the top matched sections display 602 shows a score for the policy or control comparison between the first policy and the second policy, and a relevance ranking for the comparison. The actions display 604 may provide a slider for the comparison score cutoff, a chunk view option (to view text chunks or portions of the policy), a word highlighting options (to highlight words in the policies), and a policy flip option (to switch the target and source policy designation), in various examples. The first policy summary display 606 and the second policy summary display 608 may include a policy title, a policy type, a publication date, a policy owner, a policy primary contact, and a link to the respective policy, in various embodiments. Other types of policy data may be displayed without departing from the scope of the present subject matter.

Figure 7A:
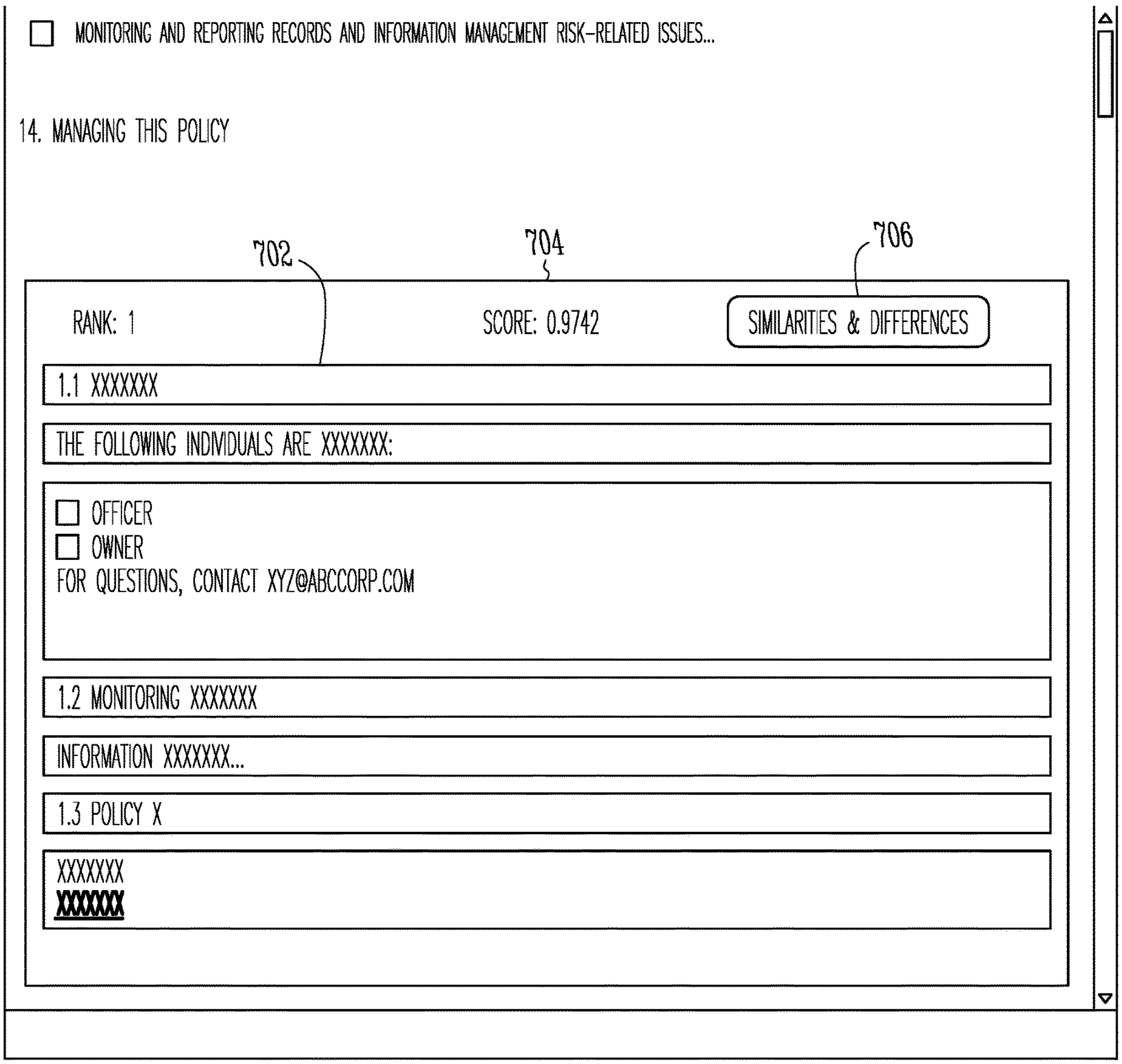
Figure 7B:
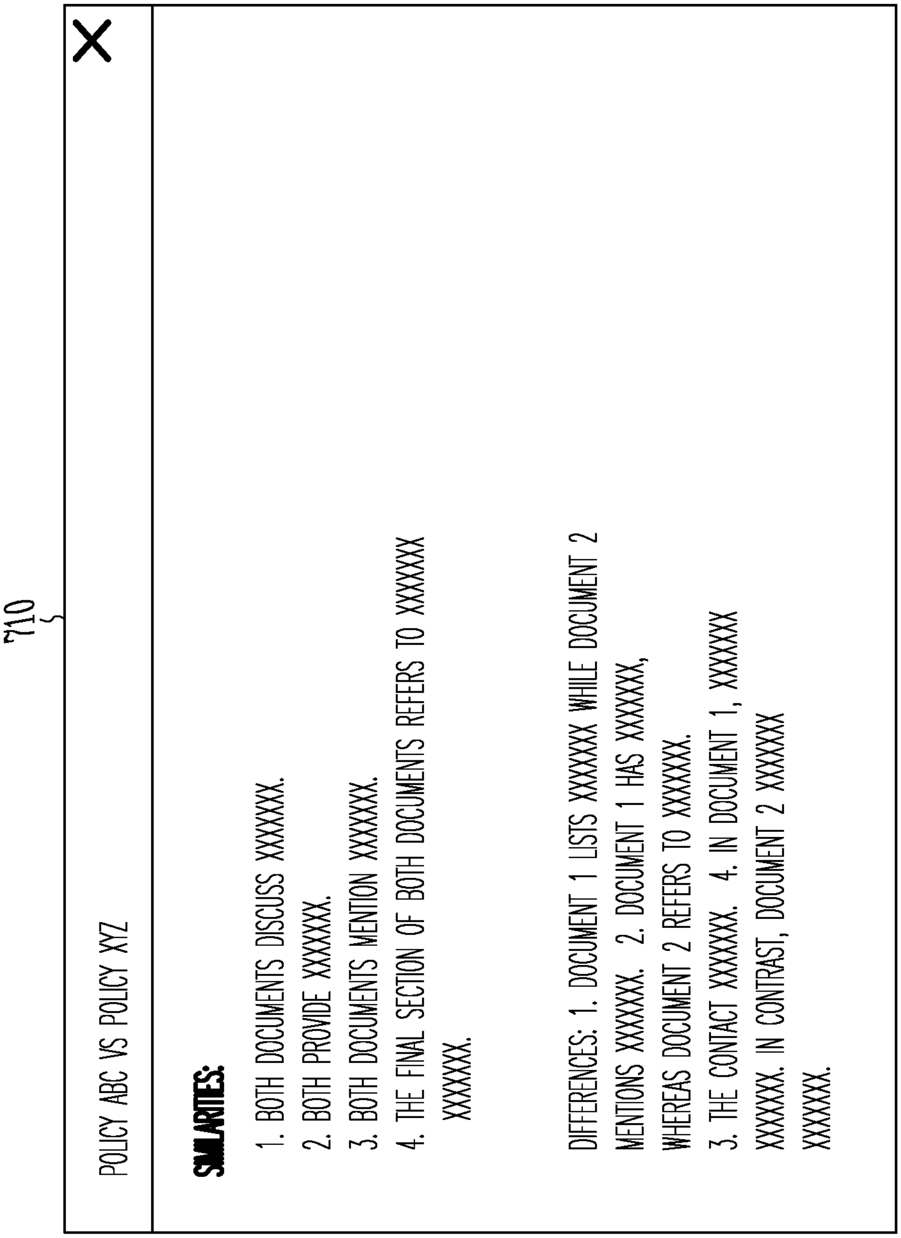

FIG. 7A illustrates comparison displays showing additional policy detail, in various examples. FIG. 7A is an additional portion of FIG. 6, visible when a user scrolls down from the GUI of FIG. 6, for example. The displayed results include policy management information 702 for at least one policy, in various examples. In some examples, the displayed results includes a rank and or/score heading 704 illustrating the rank and/or score for the policy comparison. In one example, a similarities and differences button 706 is provided for the user to obtain more detail on the policy comparison. FIG. 7B illustrates a pop up window 710 illustrating similarities and differences, such as determined by the machine learning of the present system, between the policies, in various examples. In one example, the pop up window 710 results from a user selecting the similarities and difference button 706 from FIG. 7A.

Figure 8:
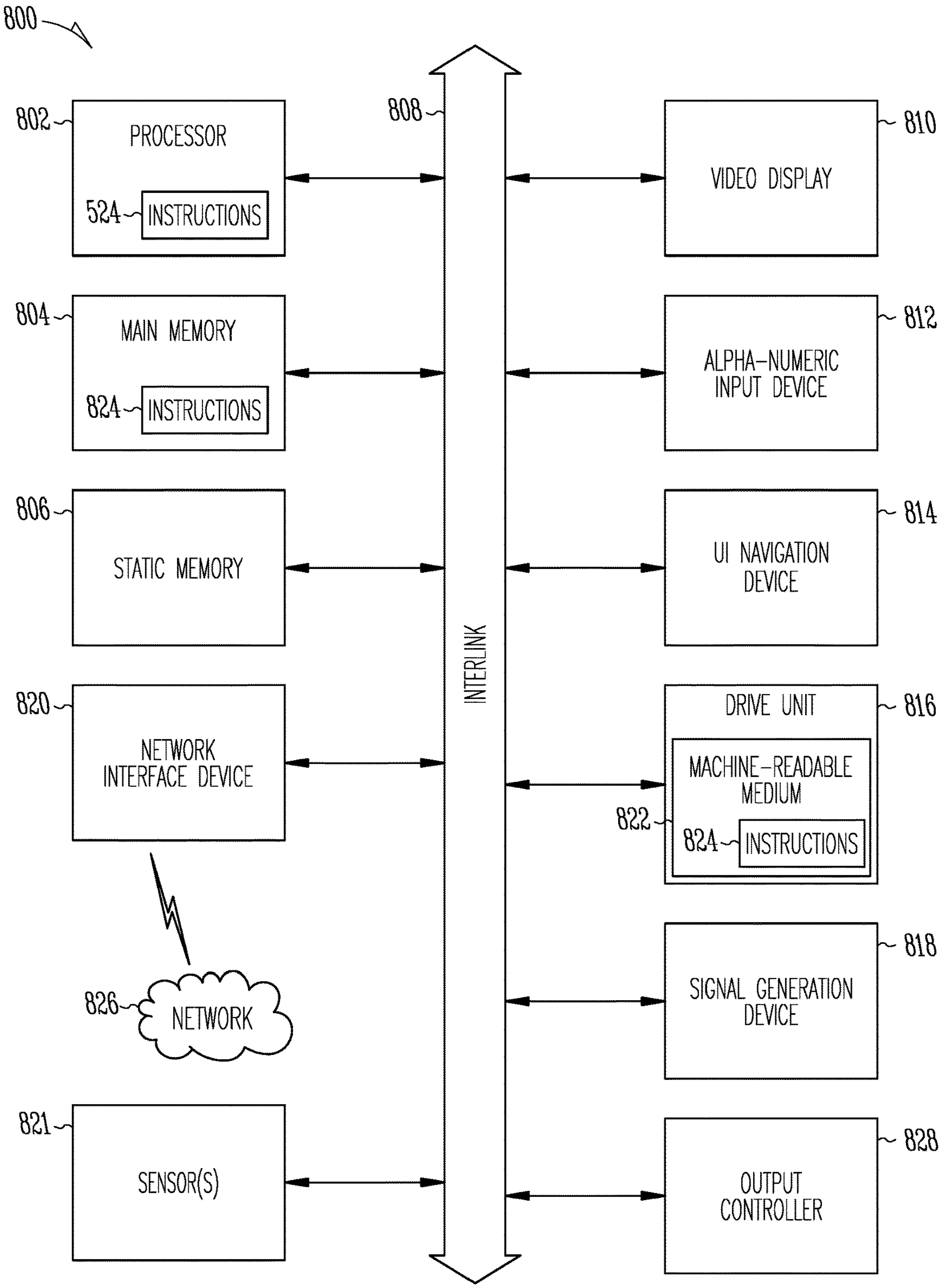
FIG. 8 is a block diagram of a machine in the example form of a computer system within which a set of instructions may be executed, for causing the machine to perform any one or more of the methodologies discussed herein.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may implement one or more of the training and prediction modules 310, 320 (e.g., as software or dedicated hardware) and may be configured to perform the methods of FIGS. 1A, 1B and 4. The machine 800 may be in the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times.

Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Other Notes and Examples

Example 1 is a computer-implemented method including receiving, by a computer system, policy data of a plurality of policies from one or more data sources, comparing, by the computer system, policy data of a first policy of the plurality of policies to policy data of one or more second policies of the plurality of policies, analyzing, by the computer system using artificial intelligence, the compared policy data to determine overlaps and gaps in the first policy and the one or more second policies, optimizing, by the computer system using artificial intelligence, the first policy and the one or more second policies to reduce the overlaps and gaps in the first policy and the one or more second policies, storing, by the computer system, the optimized first policy and the optimized one or more second policies in a storage library, and providing, by the computer system, an interactive interface to the storage library for one or more users of the computer system.

In Example 2, the subject matter of Example 1 optionally includes wherein the artificial intelligence includes a large language model (LLM).

In Example 3, the subject matter of Example 1 optionally includes wherein optimizing the first policy and the one or more second policies includes minimizing a number of policies.

In Example 4, the subject matter of Example 1 optionally includes wherein optimizing the first policy and the one or more second policies includes minimizing complexity of at least one of the plurality of policies.

In Example 5, the subject matter of Example 1 optionally includes wherein optimizing the first policy and the one or more second policies includes minimizing a number of gaps in the first policy and the one or more second policies.

In Example 6, the subject matter of Example 1 optionally includes wherein optimizing the first policy and the one or more second policies includes maximizing coverage of laws or regulations in the first policy and the one or more second policies.

In Example 7, the subject matter of Example 1 optionally includes wherein optimizing the first policy and the one or more second policies includes adding, changing or removing language from one or more of the first policy and the one or more second policies.

Example 8 is a system including: a computing system comprising one or more processors and a data storage system in communication with the one or more processors, wherein the data storage system comprises instructions thereon that, when executed by the one or more processors, causes the one or more processors to: receive policy data of a plurality of policies from one or more data sources, compare policy data of a first policy of the plurality of policies to policy data of one or more second policies of the plurality of policies, analyze, using machine learning, the compared policy data to determine overlaps and gaps in the first policy and the one or more second policies, optimize, using machine learning, the first policy and the one or more second policies to reduce the overlaps and gaps in the first policy and the one or more second policies, store the optimized first policy and the optimized one or more second policies in a storage library, and provide an interactive interface to the storage library for one or more users of the computer system.

In Example 9, the subject matter of Example 8 optionally includes wherein using machine learning includes using a machine learning model including a neural network.

In Example 10, the subject matter of Example 8 optionally includes wherein using machine learning includes using a machine learning model including a long short-term memory (LSTM) network.

In Example 11, the subject matter of Example 8 optionally includes wherein using machine learning includes using a machine learning model including bidirectional encoder representations from transformers (BERT).

In Example 12, the subject matter of Example 8 optionally includes wherein using machine learning includes using a machine learning model including natural language processing (NLP).

In Example 13, the subject matter of Example 8 optionally includes wherein using machine learning includes using a machine learning model including an artificial intelligence (AI)-based knowledge tree.

In Example 14, the subject matter of Example 8 optionally includes wherein using machine learning includes using a machine learning model including a large language model (LLM).

Example 15 is a non-transitory computer-readable storage medium, the non-transitory computer-readable storage medium including instructions that, when executed by computers, cause the computers to perform operations of: receiving policy data of a plurality of policies from one or more data sources, comparing policy data of a first policy of the plurality of policies to policy data of one or more second policies of the plurality of policies, analyzing, using artificial intelligence, the compared policy data to determine overlaps and gaps in the first policy and the one or more second policies, optimizing, using artificial intelligence, the first policy and the one or more second policies to reduce the overlaps and gaps in the first policy and the one or more second policies, storing the optimized first policy and the optimized one or more second policies in a storage library, and providing an interactive interface to the storage library for one or more users of the computers.

In Example 16, the subject matter of Example 15 optionally includes wherein optimizing the first policy and the one or more second policies includes minimizing a number of policies.

In Example 17, the subject matter of Example 15 optionally includes wherein optimizing the first policy and the one or more second policies includes minimizing complexity of at least one of the plurality of policies.

In Example 18, the subject matter of Example 15 optionally includes wherein optimizing the first policy and the one or more second policies includes minimizing a number of gaps in the first policy and the one or more second policies.

In Example 19, the subject matter of Example 15 optionally includes wherein optimizing the first policy and the one or more second policies includes maximizing coverage of laws or regulations in the first policy and the one or more second policies.

In Example 20, the subject matter of Example 15 optionally includes wherein optimizing the first policy and the one or more second policies includes adding, changing or removing language from one or more of the first policy and the one or more second policies.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computer-implemented method comprising:

receiving, by a computer system, policy data of a plurality of policies from one or more data sources; comparing, by the computer system, policy data of a first policy of the plurality of policies to policy data of one or more second policies of the plurality of policies;

analyzing, by the computer system using artificial intelligence, the compared policy data to determine overlaps and gaps in the first policy and the one or more second policies;

optimizing, by the computer system using artificial intelligence, the first policy and the one or more second policies to reduce the overlaps and gaps in the first policy and the one or more second policies, wherein the optimizing includes automatically generating policy language by: (i) identifying redundant provisions across the first policy and the one or more second policies, (ii) consolidating the redundant provisions into unified policy text, (iii) generating the rationalized policy language that eliminates the identified overlaps while filling the identified gaps using the unified policy text, and (iv) incorporating rationalized policy language into at least one of the first policy or the one or more second policies;

storing, by the computer system, the optimized first policy and the optimized one or more second policies in a storage library; and providing, by the computer system, an interactive interface to the storage library for one or more users of the computer system.

2. The method of claim 1, wherein the artificial intelligence includes a large language model (LLM).

3. The method of claim 1, wherein optimizing the first policy and the one or more second policies includes minimizing a number of policies.

4. The method of claim 1, wherein optimizing the first policy and the one or more second policies includes minimizing complexity of at least one of the plurality of policies.

5. The method of claim 1, wherein optimizing the first policy and the one or more second policies includes minimizing a number of gaps in the first policy and the one or more second policies.

6. The method of claim 1, wherein optimizing the first policy and the one or more second policies includes maximizing coverage of laws or regulations in the first policy and the one or more second policies.

7. The method of claim 1, wherein optimizing the first policy and the one or more second policies includes adding, changing or removing language from one or more of the first policy and the one or more second policies.

8. A system comprising:

a computing system comprising one or more processors and a data storage system in communication with the one or more processors, wherein the data storage system comprises instructions thereon that, when executed by the one or more processors, causes the one or more processors to:

receive policy data of a plurality of policies from one or more data sources;

compare policy data of a first policy of the plurality of policies to policy data of one or more second policies of the plurality of policies;

analyze, using machine learning, the compared policy data to determine overlaps and gaps in the first policy and the one or more second policies;

optimize, using machine learning, the first policy and the one or more second policies to reduce the overlaps and gaps in the first policy and the one or more second policies, wherein the optimizing includes automatically generating policy language by: (i) identifying redundant provisions across the first policy and the one or more second policies, (ii) consolidating the redundant provisions into unified policy text, (iii) generating rationalized policy language that eliminates the identified overlaps while filling the identified gaps using the unified policy text, and (iv) incorporating the rationalized policy language into at least one of the first policy or the one or more second policies;

store the optimized first policy and the optimized one or more second policies in a storage library; and provide an interactive interface to the storage library for one or more users of the computer system.

9. The system of claim 8, wherein using machine learning includes using a machine learning model including a neural network.

10. The system of claim 8, wherein using machine learning includes using a machine learning model including a long short-term memory (LSTM) network.

11. The system of claim 8, wherein using machine learning includes using a machine learning model including bidirectional encoder representations from transformers (BERT).

12. The system of claim 8, wherein using machine learning includes using a machine learning model including natural language processing (NLP).

13. The system of claim 8, wherein using machine learning includes using a machine learning model including an artificial intelligence (AI)-based knowledge tree.

14. The system of claim 8, wherein using machine learning includes using a machine learning model including a large language model (LLM).

15. A non-transitory computer-readable storage medium, the non-transitory computer-readable storage medium including instructions that, when executed by computers, cause the computers to perform operations of:

receiving policy data of a plurality of policies from one or more data sources;

comparing policy data of a first policy of the plurality of policies to policy data of one or more second policies of the plurality of policies;

analyzing, using artificial intelligence, the compared policy data to determine overlaps and gaps in the first policy and the one or more second policies;

optimizing, using artificial intelligence, the first policy and the one or more second policies to reduce the overlaps and gaps in the first policy and the one or more second policies, wherein the optimizing includes automatically generating policy language by: (i) identifying redundant provisions across the first policy and the one or more second policies, (ii) consolidating the redundant provisions into unified policy text, (iii) generating the rationalized policy language that eliminates the identified overlaps while filling the identified gaps using the unified policy text, and (iv) incorporating rationalized policy language into at least one of the first policy or the one or more second policies;

storing the optimized first policy and the optimized one or more second policies in a storage library; and providing an interactive interface to the storage library for one or more users of the computers.

16. The non-transitory computer-readable storage medium of claim 15, wherein optimizing the first policy and the one or more second policies includes minimizing a number of policies.

17. The non-transitory computer-readable storage medium of claim 15, wherein optimizing the first policy and the one or more second policies includes minimizing complexity of at least one of the plurality of policies.

18. The non-transitory computer-readable storage medium of claim 15, wherein optimizing the first policy and the one or more second policies includes minimizing a number of gaps in the first policy and the one or more second policies.

19. The non-transitory computer-readable storage medium of claim 15, wherein optimizing the first policy and the one or more second policies includes maximizing coverage of laws or regulations in the first policy and the one or more second policies.

20. The non-transitory computer-readable storage medium of claim 15, wherein optimizing the first policy and the one or more second policies includes adding, changing or removing language from one or more of the first policy and the one or more second policies.

* * * * *